United States Patent Office 2,874,228
Patented Feb. 17, 1959

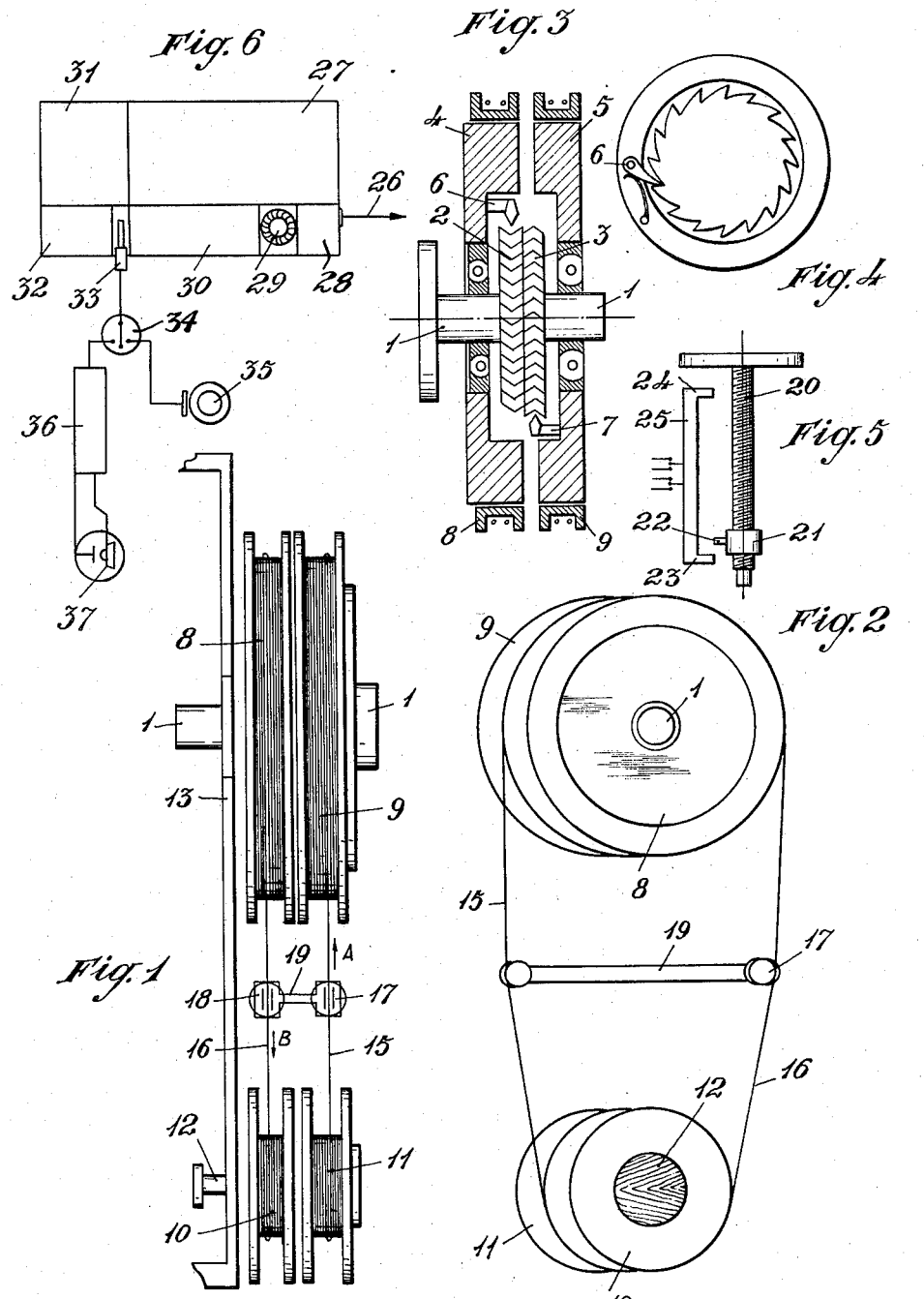

2,874,228

APPARATUS FOR RECORDING-REPEATING RADIO MESSAGES AND SIGNALS, ALSO DROPPABLE FROM AIRCRAFT AND VESSELS

Renato Alessandro Oliveti, Rome, Italy

Application June 27, 1955, Serial No. 518,291

Claims priority, application Italy June 28, 1954

5 Claims. (Cl. 179—100.2)

Under certain circumstances, it can be most useful to signal to appropriate stations, at prearranged times or otherwise, the position of persons or objects, and it is particularly important that the signal should be of very long duration, so that it can be located by means of radio direction finders, and that the signal be sure to be received, even if the persons who broadcast the signal cannot remain on the spot. It is understood that these or similar circumstances may occur, for instance, in the case of shipwrecks, or sea or air accidents, or loss of position, or war operations in enemy or contested territory.

The present invention concerns an apparatus of moderate size, highly portable, incorporating devices capable of broadcasting, under the said circumstances, continuous or intermittent signals or communications, for hours on end, till exhaustion of the power supply, in code or voice.

The apparatus designed to perform these functions comprises different units combined together, and namely:

(a) A device to wind and unwind the wire or tape on which the communications to be broadcast are previously recorded;

(b) An assembly of one or more magnetic heads, which pick up the modulations recorded on the steel wire or tape, and feed the same, after appropriate amplification, into a radio transmitter circuit;

(c) D. C. power sources, consisting of dry cells or storage batteries;

(d) A transmitter antenna;

(e) An apparatus and/or float, according to circumstances, designed to ensure the device reaching ground or water, and remaining thereon in good operating condition;

(f) An outside calibrated-dial control which adjusts the duration of the recording, which can range within very broad limits, by distributing it equally between the two tape reel pairs.

Only the devices referred to under (a), (b) and (f) form the subject of the present patent application, since the antenna, parachute and float form the subject of separate applications.

The detailed description of the invention will be more easily understood by having reference to the enclosed drawings which represent a form of embodiment thereof, as a nonlimiting example. In the drawings:

Fig. 1 is a side view of the tape or wire storage and take up reels;

Fig. 2 is a perspective view of the same;

Fig. 3 is a detail, in partial cross section, of the idle reels and of the ratchet wheels driven by pawls fastened to the reels;

Fig. 4 is a detail of one of the ratchet wheels of Fig. 3 and its pawl;

Fig. 5 is a detail of the end-of-run device and circuit switch;

Fig. 6 represents an example of the general arrangement of the various components in a portable box.

With reference to the figures, motor shaft 1 carries two ratchet wheels 2 and 3 with the teeth facing in the opposite direction. Two flywheel pulleys 4 and 5 are mounted idly on bearings of shaft 1. Each of these two pulleys carries one or more pawls 6 and 7, arranged in such a way that, when the shaft revolves in either direction, one of the two pulleys locks on the respective ratchet wheel, and is therefore driven, while the other wheel remains idle; the opposite takes place when the shaft revolves in the other direction.

On each of the flywheel pulleys 4 and 5 is pressure-fitted or locked, in such a way as to prevent angular movements with respect to the pulley, a grooved ring or reel 8 and 9, whereon the magnetic wire or tape is wound. In the case illustrated, wire is used.

Aligned with pulleys 4 and 5 are two spools 10 and 11 mounted on a single shaft 12, parallel to shaft 1 and mounted idly on bearings supported by platen 13, integral with the frame of the unit.

Initially the operator will mount, for instance, on shaft 12 a loaded spool 11, fastening the free end of the wire on reel 9, while the loaded reel 8 will be mounted on shaft 1, the free end of the wire being fastened to spool 10.

The motor drives, through an appropriate reduction drive not shown in the drawing, shaft 1 and the two ratchet wheels 2 and 3 fastened thereon. Wheel 3, by means of pawl 7 rotates reel 9, so that the wire 15 will be wound thereon in the direction indicated by the arrow A. Simultaneously, spool 11 will be driven by reel 9, and this spool 11, by driving the shaft 12 and hence spool 10, will force the latter to wind wire 16 on reel 8 in the direction shown by the arrow B, because this reel remained free moving, since pawl 6 does not engage ratchet wheel 2.

Between spools 11 and 10 and reels 8 and 9 are arranged two grooved magnetic heads 17 and 18, mounted on a single shaft 19, a known device, such as heart shaped cam (of the type used in winding machines), drives the shaft 19 into reciprocating motion, thus shifting the wires from side to side in order that they can be wound in regular superimposed layers on either spool. The heads can also be joined together, in which case, they will have two grooves at an appropriate fixed distance.

When all of the wire from a reel has been wound on the corresponding spool, or vice versa, and before the wire end fastening can be stressed, the device shown in Fig. 5 reaches the end of its run. Shaft 12, through an appropriate reduction drive, rotates screw 20 carrying a tapped block 21 which, being prevented from rotating, will move along by one thread pitch at each turn of the screw 20. The block 21 is fitted with a lug 22 which, at the end of the run (i. e. when the wire in a reel is about to finish) will hit a projection 23 or 24 of yoke 25 which actuates an appropriate electrical switch reversing the motor's polarity and switching on the magnetic head corresponding to the wire which moves in the correct direction for reproducing the recorded signal. The other wire, corresponding to the other head, will of course remain inactive, even though it passes through the groove of the unpowered magnetic head.

The assembly described above is normally designed to operate for several hours, during which it can broadcast any signal desired, repeating it any number of times, continuously or at intervals, allowance being made for the possibility of having the transmitter located by means of direction finders. The same applies in the case of the apparatus broadcasting messages instead of signals. On the other hand, it is not always necessary to use great lengths of wire or tape, and hence bulky spools and reels, because the end-of-run switching arrangement can be made to operate at any desired interval, provided the complete phrase is contained in the section of wire located between spool and reel. In these cases, both projections 23 and 24 of yoke 25 or only one of them can be moved along yoke 25, shortening correspondingly the run of wire between two consecutive reversals of the latter.

By fitting appropriate heads, the device described above can be used, in addition to repeating signals and messages, so as to erase them as well.

For code broadcasting, known systems, simplified and automatic, can be used.

Fig. 6 shows the transmitter antenna 26 and the other organs in their preferred arrangement. The wire or tape recorder and repeater is fitted in the space 27 and the transmitter in space 28.

The end-of-run device 29 will be preferably in calibrated dial form, with adjustment being made by varying the position of lugs 23, 24. The A battery, the motor battery and the B battery will be fitted respectively in 30, 31 and 32. A connector 33 is used to connect to the apparatus, through switch 34, a recording microphone 35 or an oscillator 36 controlled by a key 37 for recording code messages.

Constructional modifications of the apparatus described above fall under the protection of the present invention, insofar as the same inventive conceptions described here are applied towards the achievement of the same results.

In particular, broadcasts can also be made by means of a single spool-reel pair, instead of two pairs, and in this case the idle rewind period could be shortened automatically by making provision for a faster rewind drive. Pawls 6 and 7 acting on ratchet wheels 2 and 3 may be replaced by other free wheel systems, such as those using balls and the like.

What I claim is:

1. In a recorder-repeater for recording and repeating radio messages and signals on a magnetized carrier, a device for winding and unwinding said carrier comprising a platen, a motor shaft projecting through one end of said platen, a pair of flywheel pulleys coaxially mounted upon said motor shaft and adjacent each other, a pair of contiguous ratchet wheels coaxially disposed upon said motor shaft and intermediate said pair of flywheels, a pawl carried by one of said flywheels, another pawl carried by said other flywheel, each of said pawls being rotatable with said flywheels and engaging one of said ratchet wheels, another single shaft operatively connected to said device and projecting through another end of said platen, a pair of spools coaxially mounted on said second-mentioned shaft and rotatable therewith, a carrier operatively connected to one of said flywheels and one of said spools, another carrier operatively connected to said other flywheel and said other spool, and a bar operatively connected to said device intermediate said motor shaft and said single shaft, said bar having a magnetic head at each end thereof, each of said magnetic heads having grooves to operatively engage each of said carriers.

2. In a recorder-repeater for recording and repeating radio messages and signals on a carrier in accordance with claim 1 wherein said shaft has an end-of-run device connected to one end thereof, said end-of-run device constituting a screw mounted to one end of said shaft and being rotatable therewith, a tapped sliding block having an integrally formed lug carried upon said screw and movable thereon, a yoke adjacent said screw and fixed parallel therewith, said yoke having a pair of electrical contact projections firmly fixed intermediate its ends, at least one adjustable projection carried at one end of said yoke, another adjustable projection carried upon another end of said yoke, and an electrical switch engaging said electrical contact to reverse said motor and said magnetic heads upon contact of said integrally formed lug with one of said adjustable projections.

3. In a recorder-repeater for recording and repeating messages and signals on a carrier in accordance with claim 1 wherein each of said flywheel pulleys has a grooved ring circumjacently disposed upon the outer periphery of said pulley.

4. In a recorder-repeater for recording and repeating radio messages and signals on a carrier in accordance with claim 1 wherein said device has a calibrated dial control connected therewith to adjust the duration of the recording.

5. In a recorder-repeater for recording and repeating radio messages and signals in accordance with claim 1 wherein said carrier consists of a wire.

References Cited in the file of this patent

UNITED STATES PATENTS 2,519,553   Faulkner  -------------- Aug. 22, 1950